(12) United States Patent
Madaiah et al.

(10) Patent No.: US 10,149,240 B2
(45) Date of Patent: Dec. 4, 2018

(54) COMMUNICATION SYSTEM AND METHOD FOR ACHIEVING LOW PEAK-TO-AVERAGE POWER RATIO

(71) Applicant: Tejas Networks Ltd., Bangalore (IN)

(72) Inventors: Vinod Kumar Madaiah, Bangalore (IN); Rohith C. Aralikatti, Bangalore (IN)

(73) Assignee: Tejas Networks Ltd., Bangalore (IN)

( * ) Notice: Subject to any disclaimer, the term of this patent is extended or adjusted under 35 U.S.C. 154(b) by 148 days.

(21) Appl. No.: 15/211,655

(22) Filed: Jul. 15, 2016

(65) Prior Publication Data

US 2017/0019282 A1    Jan. 19, 2017

(30) Foreign Application Priority Data

Jul. 17, 2015  (IN) ............................ 3656/CHE/2015

(51) Int. Cl.
*H04W 52/02* (2009.01)
*H04L 27/26* (2006.01)

(52) U.S. Cl.
CPC ......... *H04W 52/02* (2013.01); *H04L 27/2615* (2013.01); *H04L 27/2636* (2013.01); *Y02D 70/00* (2018.01)

(58) Field of Classification Search
CPC .................................................... H04W 52/02

USPC ........................................................ 370/210
See application file for complete search history.

(56) References Cited

U.S. PATENT DOCUMENTS

| | | | |
|---|---|---|---|
| 6,747,946 B1* | 6/2004 | Kaneko | H04L 27/263 370/206 |
| 2003/0093282 A1* | 5/2003 | Goodwin | G06F 17/147 704/500 |
| 2007/0165730 A1* | 7/2007 | Whinnett | H04L 27/2614 375/260 |

* cited by examiner

*Primary Examiner* — Natasha W Cosme
(74) *Attorney, Agent, or Firm* — Venable LLP; Jeffri A. Kaminski

(57) ABSTRACT

The present disclosure pertains to communication systems and methods for achieving low peak to average power ratio (PAPR) for transmitted symbols of wireless devices. In an aspect, the present disclosure relates to a transmitter of a communication system, wherein the transmitter includes a circular convolution module that is configured to circularly convolve a preset number of values with a group of M symbols from a total number of symbols, an M-point DFT module that is configured to process output of the circular convolution to generate a first set of discrete Fourier transform (DFT) samples, and an N-point IDFT module that is configured to process the first set of DFT samples to obtain a first set of inverse discrete Fourier transform (IDFT) samples for onward transmission to a receiver.

15 Claims, 10 Drawing Sheets

500 ⤴

510 ⤴

COMMUNICATION SYSTEM AND METHOD FOR ACHIEVING LOW PEAK-TO-AVERAGE POWER RATIO

CROSS REFERENCE TO RELATED APPLICATION

The present application claims priority to Indian Patent Application No. 3656/CHE/2015, filed Jul. 17, 2015, the disclosure of which is hereby incorporated by reference in its entirety

TECHNICAL FIELD

The present disclosure generally relates to a wireless communication system that provides lower peak to average power ratio (PAPR). In particular, the present disclosure pertains to communication systems and methods for achieving low peak to average power ratio (PAPR) for transmitted symbols of wireless devices.

BACKGROUND

Background description includes information that may be useful in understanding the present invention. It is not an admission that any of the information provided herein is prior art or relevant to the presently claimed invention, or that any publication specifically or implicitly referenced is prior art.

As new applications and services are being offered/consumed over wireless devices, there is an increasing need for high data rate in order to provide better customer satisfaction. At present, there are several communication standards such as orthogonal frequency division multiplexing (OFDM), single carrier-frequency division multiple access (SC-FDMA), and discrete fourier transform precoded orthogonal frequency division multiple access (DFT-pre-coded-OFDMA), among others that aim to achieve high data rates. In wireless communication standards such as OFDM and OFDMA, a signal is "spread out" and distributed among subcarriers, which send portions of the signal in parallel. High data rate is achieved by sending a signal in parallel over all possible channels available between the sender device, interchangeably referred to as transmitter hereinafter, and the receiver device, interchangeably referred to as receiver hereinafter. To minimize interference and loss of data during transmission, subcarrier frequencies are chosen in such as a way that the modulated data streams are orthogonal to each other, and cross-talk between the sub-channels is eliminated so that inter-carrier guard bands are not required. At receiver side, the receiver receives and reassembles the data that is sent in parallel over different channels and/or sub-channels by the transmitter.

These existing standards, also interchangeably referred to as protocols hereinafter, that are in use today, suffer from a high peak-to-average power ratio (PAPR), where PAPR of the symbols being transmitted using any of these standards is very high. PAPR, which is ratio of Peak Power with respect to Average Power of all the symbols that will be or are transmitted by the transmitter, is a performance parameter for measuring performance and/or efficiency of any transmitter/transceiver. PAPR is the peak amplitude squared (giving the peak power) divided by the RMS value squared (giving the average power), also calculated as square of crest factor. PAPR is a metric used to measure transmission efficiency of the RF power amplifier that is present within a radio transmitter, wherein ideal PAPR value of transmitted symbols by any transmitter should be one, and a high PAPR value dictates use of a linear transmit chain to avoid signal distortion that results in degraded error performance and spectral re-growth beyond intended signal bandwidth. In particular, power amplifier (PA) characteristics of the transmitter exhibit a saturation of output power with increased input power and hence present a nonlinear behavior. To ensure linearity with high PAPR, PA of the transmitter is operated away from saturation, i.e. with a power back-off. Operating with a power back-off results in decreased transmission range of the transmitter and reduced power efficiency of the transmitter. Low PAPR value is also required for increased transmission range of the transmitter and to reduce the power consumption by the transmitter. By lowering the PAPR value, infrastructure cost for setting-up dense transmitter/transceiver network can also be controlled.

As the cost of setting-up and maintenance of access points/transmitters are increasing, it is better to utilize transmitters to their maximum/optimal potential, and use existing transmitters in the most efficient manner possible, and hence one of the primary objectives for any wireless communication scheme is to lower the PAPR of the transmitted symbols.

In prior art solutions, in order to achieve better PAPR, different techniques have been proposed including coding techniques, constellation reshaping, tone-reservation, and selective mapping, to name a few. For instance, amplitude clipping can be directly applied to reduce the PAPR. However, this clipping results in in-band and out-of-band distortions, which results in Symbol-Error-Rate (SER) degradation and out-of-band radiation respectively. To counter the effect of out-of-band distortions, a filter can be applied to the clipped signal. However, this might also regenerate new peaks. Hence, amplitude clipping reduces the PAPR at the expense of quantifiable distortion.

In another approach to reduce the PAPR, symbols are mapped into code words, and extra bit(s) are padded/added to those code words, and only code words that do not result in high PAPR are chosen for transmission. This technique requires lookup tables and exhaustive search for the best code word. Another approach known as selected mapping reduces PAPR by generating different sets of data blocks and transmitting one with the lowest PAPR. This is done by multiplying the initial data set with different phase sequences, and the optimal phase sequence is sent separately to the receiver as side information. A similar approach known as the Interleaving has also been used in past that uses interleaver instead of a set of phase sequences to produce different sequences of the same data and transmits the one with the minimum PAPR.

Some methods use extra tones to add a peak-reducing signal to the original multicarrier signal to reduce the overall PAPR. This signal can be stripped off at the receiver using the information available at the reserved tones. However, none of the foregoing techniques have proven entirely satisfactory.

Another similar technique is proposed in SC-FDMA standard that performs a Fourier transform on the signal before mapping and sending the signal over the subcarriers to send it through a serial transmission (rather than in parallel transmission as used by ODFM). On reception of the transmission, an inverse Fourier transform is performed. Though, the SC-FDMA scheme offers a lower PAPR than the OFDM and OFDMA, effectiveness and/or efficiency of SC-FDMA scheme is limited by the choice of mapping scheme employed. Performance of SC-FDMA also suffers due to serial transmission.

Though several techniques/schemes as cited above have been proposed in the past, none of the foregoing techniques have proven entirely satisfactory. Therefore, there still exists a need for communication systems and methods for achieving low PAPR values for symbols transmitted by any transmitter.

OBJECTS OF THE INVENTION

An object of the present disclosure is to provide a communication system and method for achieving low peak to average power ratio over a transmitter of a wireless device.

Another object of the present disclosure is to provide a communication system and method for achieving low peak to average ratio and minimizing power consumption of the transmitter/access points.

Another object of the present disclosure is to provide a transmitter having a low PAPR value, which provides wide coverage.

An object of the present disclosure is to provide a method and system for maximum or optimal use of transmitter and communication channels.

An object of the present disclosure is to provide a low PAPR value by temporal and spacial spreading.

An object of the present disclosure is to provide a communication system and method for information communication that employ a transmitter which sends processed symbols spread in time domain to the receiver for achieving low PAPR.

SUMMARY

The present disclosure generally relates to a wireless communication system that provides lower peak to average power ratio (PAPR). In particular, the present disclosure pertains to communication systems and methods for achieving low peak to average power ratio (PAPR) for transmitted symbols of wireless devices.

In an aspect, the present disclosure relates to a transmitter of a communication system, wherein the transmitter includes a circular convolution module that is configured to circularly convolve a preset number of values with a group of M symbols from a total number of symbols, an M-point DFT module that is configured to process output of the circular convolution to generate a first set of discrete Fourier transform (DFT) samples, and an N-point IDFT module that is configured to process the first set of DFT samples to obtain a first set of inverse discrete Fourier transform (IDFT) samples for onward transmission to a receiver.

In an aspect, the receiver can include an N-point DFT module that is configured to process the received first set of IDFT samples to obtain a second set of DFT samples, an M-point IDFT module that is configured to process the second set of DFT samples to obtain a second set of IDFT samples, and a circular de-convolution module that is configured to circularly de-convolve the preset number of values with the second set of IDFT samples to obtain the M symbols.

In an aspect, the transmitter and the receiver can be connected through a communication channel. In another aspect, the transmitter can further include a source encoding module that is configured to encode information to be transmitted into the total number of symbols, and wherein the receiver can also include a source decoding module that is configured to decode the total number of symbols to retrieve the information transmitted by the transmitter. In an aspect, the preset number of values can be obtained from any or a combination of mathematical distribution, Gaussian distribution, Soliton distribution, Rayleigh distribution, Rician distribution, Inverse Gaussian distribution, Raised Cosine distribution, and Root raised Cosine distribution. These distributions bring the peak and average closer and thereby making PAPR closer to one.

In another aspect, one or more zeros can be appended to the first set of DFT samples before conversion to the first set of IDFT samples to enable compression in frequency domain. In yet another aspect, sub-carrier mapping can be performed on the first set of DFT samples before conversion to the first set of IDFT samples to enable compression in frequency domain. In another aspect, the receiver can be configured to filter the received first set of IDFT samples before processing the received first set of IDFT samples. In another aspect, each symbol of the group of M symbols can be circularly convolved with at least a part of the preset number of values.

In another aspect, the M-point DFT module can be implemented as an M-point Fast Fourier Transform (FFT), and wherein the N-point IDFT module can be implemented as an N-point Inverse Fast Fourier Transform (IFFT), wherein $N>=M$. In yet another aspect, at the receiver, the N-point DFT module can be implemented as an N-point Fast Fourier Transform (FFT), and wherein the M-point IDFT module can be implemented as an M-point Inverse Fast Fourier Transform (IFFT).

In an aspect, the present disclosure further relates to a method for communication between a transmitter and a receiver, wherein the method includes the step of circularly convolving a preset number of values with a group of M symbols from a total number of symbols. The method can further include the step of processing, based on an M-point DFT operation, output of the circular convolution to generate a first set of discrete Fourier transform (DFT) samples; and processing, based on an N-point IDFT operation, the first set of DFT samples to obtain a first set of inverse discrete Fourier transform (IDFT) samples for onward transmission to the receiver. The method can further include the steps of processing, based on an N-point DFT operation, the received first set of IDFT samples to obtain a second set of DFT samples; and processing, based on an M-point IDFT operation, the second set of DFT samples to obtain a second set of IDFT samples. The method can further include the step of circularly de-convolving the preset number of values with the second set of IDFT samples to obtain the M symbols.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
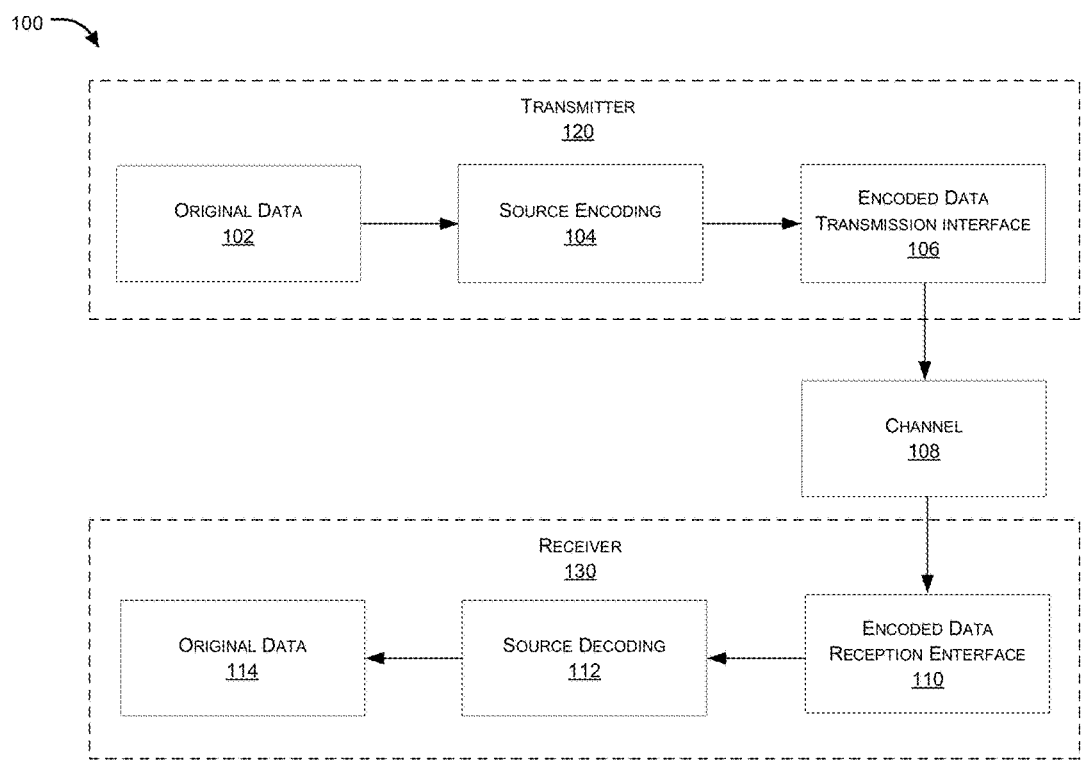
FIG. 1 illustrates an exemplary block diagram of an existing transmitter and receiver in a communication network that can be modified to achieve low PAPR value in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure generally relates to a wireless communication system that provides lower peak to average power ratio (PAPR). In particular, the present disclosure pertains to communication systems and methods for achieving low peak to average power ratio (PAPR) for transmitted symbols of wireless devices.

In an aspect, the present disclosure relates to a transmitter of a communication system, wherein the transmitter includes a circular convolution module that is configured to circularly convolve a preset number of values with a group of M symbols from a total number of symbols, an M-point DFT module that is configured to process output of the circular convolution to generate a first set of discrete Fourier transform (DFT) samples, and an N-point IDFT module that is configured to process the first set of DFT samples to obtain a first set of inverse discrete Fourier transform (IDFT) samples for onward transmission to a receiver.

In an aspect, the receiver can include an N-point DFT module that is configured to process the received first set of IDFT samples to obtain a second set of DFT samples, an M-point IDFT module that is configured to process the second set of DFT samples to obtain a second set of IDFT samples, and a circular de-convolution module that is configured to circularly de-convolve the preset number of values with the second set of IDFT samples to obtain the M symbols.

In an aspect, the transmitter and the receiver can be connected through a communication channel. In another aspect, the transmitter can further include a source encoding module that is configured to encode information to be transmitted into the total number of symbols, and wherein the receiver can also include a source decoding module that is configured to decode the total number of symbols to retrieve the information transmitted by the transmitter. In an aspect, the preset number of values can be obtained from any or a combination of mathematical distribution, Gaussian distribution, Soliton distribution, Rayleigh distribution, Rician distribution, Inverse Gaussian distribution, Raised Cosine distribution, and Root raised Cosine distribution.

In another aspect, one or more zeros can be appended to the first set of DFT samples before conversion to the first set of IDFT samples to enable compression in frequency domain. In yet another aspect, sub-carrier mapping can be performed on the first set of DFT samples before conversion to the first set of IDFT samples to enable compression in frequency domain. In another aspect, the receiver can be configured to filter the received first set of IDFT samples before processing the received first set of IDFT samples. In another aspect, each symbol of the group of M symbols can be circularly convolved with at least a part of the preset number of values.

In another aspect, the M-point DFT module can be implemented as an M-point Fast Fourier Transform (FFT), and wherein the N-point IDFT module can be implemented as an N-point Inverse Fast Fourier Transform (IFFT), wherein N>=M. In yet another aspect, at the receiver, the N-point DFT module can be implemented as an N-point Fast Fourier Transform (FFT), and wherein the M-point IDFT module can be implemented as an M-point Inverse Fast Fourier Transform (IFFT).

In an aspect, the present disclosure further relates to a method for communication between a transmitter and a receiver, wherein the method includes the step of circularly convolving a preset number of values with a group of M symbols from a total number of symbols. The method can further include the step of processing, based on an M-point DFT operation, output of the circular convolution to generate a first set of discrete Fourier transform (DFT) samples; and processing, based on an N-point IDFT operation, the first set of DFT samples to obtain a first set of inverse discrete Fourier transform (IDFT) samples for onward transmission to the receiver. The method can further include the steps of processing, based on an N-point DFT operation, the received first set of IDFT samples to obtain a second set of DFT samples; and processing, based on an M-point IDFT operation, the second set of DFT samples to obtain a second set of IDFT samples. The method can further include the step of circularly de-convolving the preset number of values with the second set of IDFT samples to obtain the M symbols.

FIG. 1 illustrates an exemplary block diagram 100 of an existing transmitter and receiver in a communication network that can be modified to achieve low PAPR value in accordance with an embodiment of the present disclosure. A typical communication architecture/flow involves reception of original data 102 that needs to be transmitted by a transmitter 120 to a receiver 130, source encoding 104 of the original data 102, and transmission, at interface 106, of the encoded data through channel 108 to a receiver interface 110 of receiver 130. At receiver 130, received encoded data can be forwarded to a decoder for performing source decoding 112 to retrieve the original data 114, which should be same as the original data 102.

Embodiments of the present disclosure can be employed in/with the transmitter 120 for achieving low PAPR value. In an example implementation, transmitter 102 can use one or more of the existing source encoding techniques including but not limiting to Hoffman encoding, for compressing/encoding the source data in order to transmit the encoded data over transmission channel more efficiently. Source encoding 104 can be performed for efficient transmission of original data 102 over available channels. Source encoding 104 can be performed on original data 102 so as to reduce the number of bits required to represent and transmit the original data 102 over the channel 108, which may have limited bandwidth. In example implementations, source code encoding can be performed in conjunction with analog-to-digital conversion, in case the original data 102 is received in analog form. Source encoding can be performed to represent original data 102 in digital format by using as few bits as possible. By source encoding 104 of the original data 102, transmitter 120 can transmit more data per unit time over the same channel 108.

In an example implementation, based on the type of data that needs to be transmitted, transmitter 120 of the present disclosure can select one or another suitable source encoding technique. Furthermore, in order to enhance efficiency of communication and to utilize the channel 108 to its maximum potential, a suitable channel encoding technique can be selected. Encoding data can be transmitted through a transmission interface 106 of the transmitter 120 over one or more available channels 108. In an example implementation, it is possible that portions of encoded data are transmitted in parallel over two or more channels 108 or sub-channels available between the transmitter 120 and receiver 130. In an example implementation, one or more suitable channel or sub-channel mapping techniques can be used for mapping portions of encoded data over one or more available channels/sub-channels 108. Channel(s) or sub-channels in the present disclosure have been used interchangeably to refer to all available channels 108 between transmitter 120 and receiver 130. Although most of the embodiments of the present disclosure have been explained with reference to a wireless communication involving a wireless transmitter and a wireless receiver, a wired communication network can also be configured to use the teaching of the present disclosure so as to receive low PAPR ratio.

In an example implementation, receiver 130 can receive encoded data transmitted from channel 108, and perform source decoding 112 to get the original data 114. In an example implementation, original data 114 and original data 102 should be same data/message that the transmitter 120 intended to send to the receiver 130.

For achieving low PAPR value, transmitter 120 can use teachings the present disclosure, wherein the transmitter 120, after source encoding 104 of original data 102, can perform circular convolution by convolving circularly, a preset number of values with a group of M symbols from a total number of symbols received after source encoding to obtain circularly convolved symbols. Transmitter 120 can then perform an M point discrete fourier transformation (DFT) for obtaining DFT transformed samples, which can be further processed by N-point inverse discrete Fourier transform (IDFT) to obtain IDFT transformed samples. In an example implementation, the IDFT transformed samples can be transmitted through a transmission interface such as 106 over a channel such as 108 to the receiver 130. In an example implementation, transmitter 120 can perform N-point IDFT over the M-point transformed DFT samples. In an example implementation, the IDFT transformed samples can be transmitted by the transmission interface 106 serially over a selected channel 108. In another example implementation, portions of IDFT transmitted samples can be transmitted by the transmission interface 106 in parallel over one or more available channels/sub-channels.

In an aspect, receiver 130 receives the IDFT transformed samples over the encoded data reception interface 110. In case the IDFT transformed samples are received in parallel from one or more channels, the encoded data reception interface 110 can assemble the received IDFT transformed samples. Before decoding the samples, received data samples can be processed by a suitable DFT technique to obtain a second set of DFT transformed samples, which can further be processed by a suitable IDFT technique to obtain a second set of IDFT transformed samples, which can further be de-convolved with the appropriate preset number of values by performing the circular de-convolution. After performing circular de-convolution over the second IDFT transformed samples, a suitable source decoding 112 can be performed to obtain original data 114 at the receiver 130.

With reference to FIG. 2, embodiments of the present disclosure can provide a communication system for achieving low PAPR value for transmitted symbols from a transmitter to a receiver. The proposed communication system 200 can include a transmitter side sub-system 202 that is configured to process signal/data to be transmitted, and a receiver side sub-system 252 that is configured to process the received signal/data to generate/obtain the original signal/data.

Figure 2A:
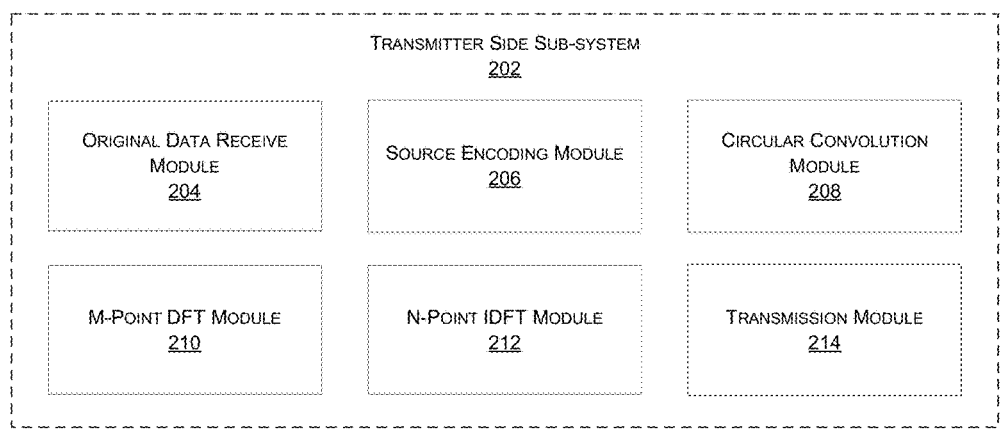
FIG. 2A illustrates an exemplary module diagram of transmitter side sub-system of communication system for achieving low PAPR value in accordance with an embodiment of the present disclosure.

FIG. 2A illustrates an example module diagram of transmitter side sub-system 202 of the proposed communication system 200 for achieving low PAPR value in accordance with an embodiment of the present disclosure. As shown in FIG. 2A, the transmitter side sub-system 202 can include an original data receive module 204 that can be configured to receiver an original signal/data/message to be transmitted, a source encoding module 206 that is configured to perform source encoding to represent the original data using as many few bits as possible in digital format, a circular convolution module 208 that is configured to perform circular convolution of a group of M symbols selected from a total number of symbols of the source encoded data with a preset number of values, an M-point DFT module 210 that is configured to perform Discrete Fourier Transformation (DFT) over the data bits, also referred to as symbols hereinafter, received from the circular convolution module 208 to obtain a first set of DFT transformed symbols, an N-point IDFT module 212 that is configured to perform inverse DFT (IDFT) over the first set of DFT transformed symbols to get a first set of IDFT transformed symbols, and a transmission module 214 that is configured to transmit the first set of IDFT transformed symbols over the available channel(s) to a receiver.

In an example implementation, original data receive module 204 can be configured to receive digital data as well as analog signal. In case the original data receive module 204 receives analog signal, an analog to digital converter (ADC) can be incorporated with the original data receiving module 204 and can be used for transforming the analog signal into digital signal by presenting the resultant signal with help of binary codes or symbols.

In an example implementation, source encoding module 206 can be configured to encode the original data (as received from the original data receiving module 204), wherein source ending can be performed for minimizing the data bits that are required to present a given original data using as many minimum bits as possible. Using source encoding module 206, redundant bits present in the original data can be removed or suppressed. In an example implementation, source encoding module 206 can be configured to perform loss-less compression. In another example implementation, source encoding module 206 can be configured to perform Hoffmann encoding of the received original data.

Encoded data bits/symbols as generated by the source encoding module 206 can then be processed by circular convolution module 208, which can be configured to perform circular convolution of a group of M symbols selected from a total number of symbols of the source encoded data with a preset number of values. In an example implementation, the preset number of values can be dynamically generated for each communication session or can be fixed for all communications initiated by the transmitter 202. In an instance, circular convolution of the M selected symbols of encoded data can be performed with X bits of preset values, wherein X is lesser than or equal to M. In order to perform convolution of M selected symbols with X bits of preset values, M-X number of zeros can be added with X selected bits of preset values. In an implementation, circular convolution module 208 can be configured to perform circular convolution to achieve time domain spreading of encoded data. Circular convolution, also commonly referred to as cyclic convolution of two a periodic functions (i.e. Schwartz functions) can be said have occurred when one of them convolves in the normal way with a periodic summation of the other function. In an example implementation, discrete time Fourier transform (DTFT) of the product of two discrete sequences can be periodic convolution of the DTFTs of the individual sequences. In an example implementation, original data, also referred to as input symbols consisting of M codewords can be circularly convolved with an M point preselected discrete time signal. One can appreciate that if the original data or input symbols are longer than the M codewords/symbols, the original data can be divided in a block of M codewords/symbols, and each block can then be circularly convolved with the M point preselected discrete time signals.

In an example implementation, circular convolution module 208 can be configured to obtain preset number of values, also referred to as preselected discrete time signals using a suitable mathematical distribution function including but not limiting to Gaussian, Soliton, Rayleigh, Rician, Inverse Gaussian, Raised Cosine, and Root raised Cosine functions.

In example implementation, value of circular convolution of function $X[n]$ with $h[n]$ can be $X[n]*h[n]$. For instance, in a situation where the duration of X sequence is n (or less), and duration of h sequence is significantly less, many of the values of the circular convolution are identical to values of $x*h$. In an example implementation, circular convolution module 208 can use fast Fourier transform (FFT) algorithm or a circular convolution theorem for efficiently calculating circular convolution. In an example implementation, if the encoded data is longer than the preset number of values, circular convolution module 208 can divide the encoded data into blocks and process each block piecewise.

In an aspect, output data bits from the circular convolution module 208 can be further processed by the M-point DFT module 210, also referred as DFT module hereinafter, which can apply discrete Fourier transformation functions such as Fast Fourier Transform (FFT) over the output of data bits received from the circular convolution module 208 to obtain a first set of DFT transformed symbols or data bits. In an example implementation, DFT module 210 can be configured to convert the time spread output data bits as received from the circular convolution module 208 into frequency domain. The DFT module 210 can be configured to convert a finite list of equally spaced samples of a function into a list of coefficients of a finite combination of complex sinusoids, ordered by their frequencies that have the same sample values. In an exemplary implementation, DFT module 210 can convert the sampled function from its original domain (often time or position along a line) to the frequency domain. For example, the DFT module 210 can be configured to convert the output data bits received from circular convolution module 208 into frequency domain.

One can appreciate that both time domain spreading as well as frequency domain spreading can be performed on the original data in teaching of the present disclosure. In an example implementation, DFT module 210 can perform an M-point Discrete Fourier Transformation (DFT) to produce a frequency domain representation of the input symbols that are received after the circular convolution operation.

In another example implementation, the transmitter sub-system 202 can include a sub-carrier mapping module that can map each of the M-point DFT outputs, in conjunction with Q-code and Q-frequency values to one of the N (>M) orthogonal subcarriers that can be transmitted. A typical value of N can be 256 subcarriers, and M=N/Q is an integer multiple of M and Q is the bandwidth expansion factor of the symbol sequence. If all terminals transmit M symbols per block, the system can handle Q simultaneous transmissions without co-channel interference.

In an example implementation, sub-carrier mapping module can also append N-M zeros to the DFT transformed symbols if N is greater than M (M coming from the M-point DFT operation). In an example implementation, the DFT module 210 can produce the first set of DFT transformed symbols or data bits, which can further be processed by an N-point IDFT module 212 that transforms the first set of DFT transformed symbols into first set of IDFT transformed symbols. In an example implementation, the N-point IDFT module 212 can be configured to transform subcarrier amplitudes to a complex time domain signal, wherein each such complex time domain signal can then modulate a single frequency carrier, and the modulated symbols can ultimately be transmitted sequentially.

In an example implementation, the first set of IDFT transformed symbols can be transmitted through transmission module 214 over one or more channels or sub-channel. In an example implementation, transmission module 214 can be configured to use OFDM scheme, for instance, and transmit the first set of IDFT transformed symbols as ODFM symbols. In another example implementation, transmission module 214 can be configured to select an appropriate channel and/or sub-channel(s), and transmit the first set of IDFT transformed symbols in sequence. In another example implementation, transmission module 214 can be configured to use one or more channels and/or sub-channels to send portions of transformed data symbols in parallel.

In an example implementation, transmitter can insert a set of symbols referred to as a cyclic prefix in order to provide guard time to prevent inter-block interference (IBI) due to multipath propagation. It also can perform a linear filtering operation referred to as pulse shaping in order to reduce out-of-band signal energy.

On receiving the IDFT transformed symbols from the channel(s), the receiver can transform the received signal into frequency domain via N-point DFT, followed by M-point IDFT, and then apply circular de-convolution with the appropriate preselected M-point discrete time signal. In an example implementation, the receiver can be configured to perform equalization of symbols to combat inter-symbol interference caused by modulation by using a single carrier before performing N-point IDFT. Equalized symbols can then be transformed back into the time domain via the M-point IDFT, and detection and decoding can take place in the time domain. In an example implementation, source decoding can be performed to obtain the original data/signal.

Figure 2B:
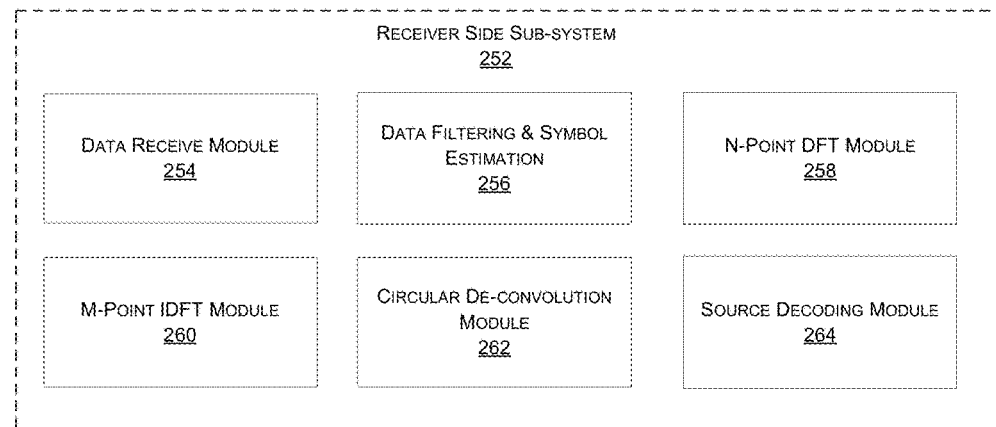
FIG. 2B illustrates an exemplary module diagram of a receiver side sub-system of communication system for achieving low PAPR in accordance with an embodiment of the present disclosure.

FIG. 2B illustrates an example module diagram 250 of a receiver side sub-system 252 of communication system for achieving low PAPR in accordance with an embodiment of the present disclosure. As shown in FIG. 2B, receiver side sub-system 252 can include a data receive module 254 that is configured to receive the first set of IDFT transformed symbols as transmitted by the transmitter, a data filtering and symbol estimation module 256 that is configured to apply one or more filters to correct any noise that may have been introduced during transmission and estimate the symbols by sampling the received symbols/IDFT transformed data, an N-Point DFT module 258 that is configured to perform DFT over the filtered symbols to transform the filtered symbols into frequency domain to get a second set of DFT transformed symbols, an M-point IDFT module 260 that is configured to perform IDFT over the second set of DFT transformed symbols to get a second set of IDFT transformed symbols, a circular de-convolution module 262 that is configured to perform circular convolution over the second set of IDFT transformed symbols with preset number of values or preselected discrete time signal, and a source decoding module 264 that is configured to perform decoding of the de-convolved symbols to obtain the original symbols/data/message.

In an example implementation, data receive module 254 can be configured to collect symbols from one or more channels, and compile the symbols for further processing by the other subsequent modules. In an example implementation, data filtering & symbol estimation module 256 can be configured to apply one or more data filters such as low-pass filters, high-pass filters, Savitzky-Golay filter, among others to correct/remove any noise that may have been introduced during transmission of symbols. In an example implementation, the data filtering and symbols estimation module 256 can be configured to estimate the received symbols by sampling the received symbols/first IDFT transformed data as transmitted by the transmitter.

In an example implementation, N-point DFT module 258 can be configured to apply discrete Fourier transform, such as FFT over the filtered symbols to convert the filtered symbols into frequency domain. The N-Point DFT module 258 can apply discrete Fourier transformation functions, such as Fast Fourier Transform (FFT) over the filtered symbols received from the data filtering & symbol estimation module 256 to obtain a second set of DFT transformed symbols or data bits. In an example implementation, N-point DFT module 258 can be configured to convert the time domain signal as received from the data filtering & symbol estimation module 256 into frequency domain.

One can appreciate that by using one more mode modules of the present disclosure, the receiver side subsystem can perform de-spreading in both the time domain as well as in the frequency domain. In an example implementation, the N-Point DFT module 258 can perform an N-point discrete Fourier transform (DFT) to produce a frequency domain representation of the filtered symbols as received from the data filtering & symbol estimation module 256.

In an example implementation, the receiver sub-system can include a sub-carrier de-mapping module that can de-maps each of the N-point DFT outputs, in conjunction with Q-code and Q-frequency values to one of the N (>M) orthogonal subcarriers that can be transmitted. In an example implementation, sub-carrier de-mapping module can be configured to remove N-M zeros from the second DFT transformed symbols.

In an example implementation, the second set of DFT transformed symbols or data bits can further be processed by an M-point IDFT module 260 that can transform the second set of DFT transformed symbols into a second set of IDFT transformed symbols. In an example implementation, M-point IDFT module 260 can be configured to transform the subcarrier amplitudes to a complex time domain signal.

In an example implementation, circular de-convolution module 262 can be configured to perform circular de-convolution of the second set of IDFT transformed symbols with a preset number of values or M-point discrete time signal. In example implementation, the same preset number of values or M-point discrete time signal as used by the transmitter can be used for circular de-convolution of the second set of IDFT transformed symbols. The circular de-convolution module 262 can be configured to produce de-convolved symbols, which can further be processed by the source decoding module 264 to retrieve/obtain the original symbols/data/message. In an example implementation, source decoding module 264 can be configured to provide data in either digital format or analog format. In case the output is required in analog format, source decoding module 264 can include a digital to analog converter for converting the convolved symbols into an analog signal.

One can appreciate that transmitter side sub-system 202 achieves low PAPR value by spreading the encoded data into time domain by performing circular convolution, and converting the data into frequency domain by performing DFT, then performing sub-carrier mapping and/or addition of zeros (if N>M, which leads to further spreading in time domain) before transmission.] In an example implementation, the sequence of operation or performance of different modules can be interchanged. For example, transmission side sub-system 202 can be configured to perform operation of circular convolution module 208 after N-Point IDFT module 212. Similarly, sequence of operation of modules of receiver side sub-system 252 can also be interchanged. Because convolving in frequency domain leads to increase in PAPR as it leads to spreading in frequency domain. Instead convolution can be done after the IDFT module in time domain itself.

Figure 3:
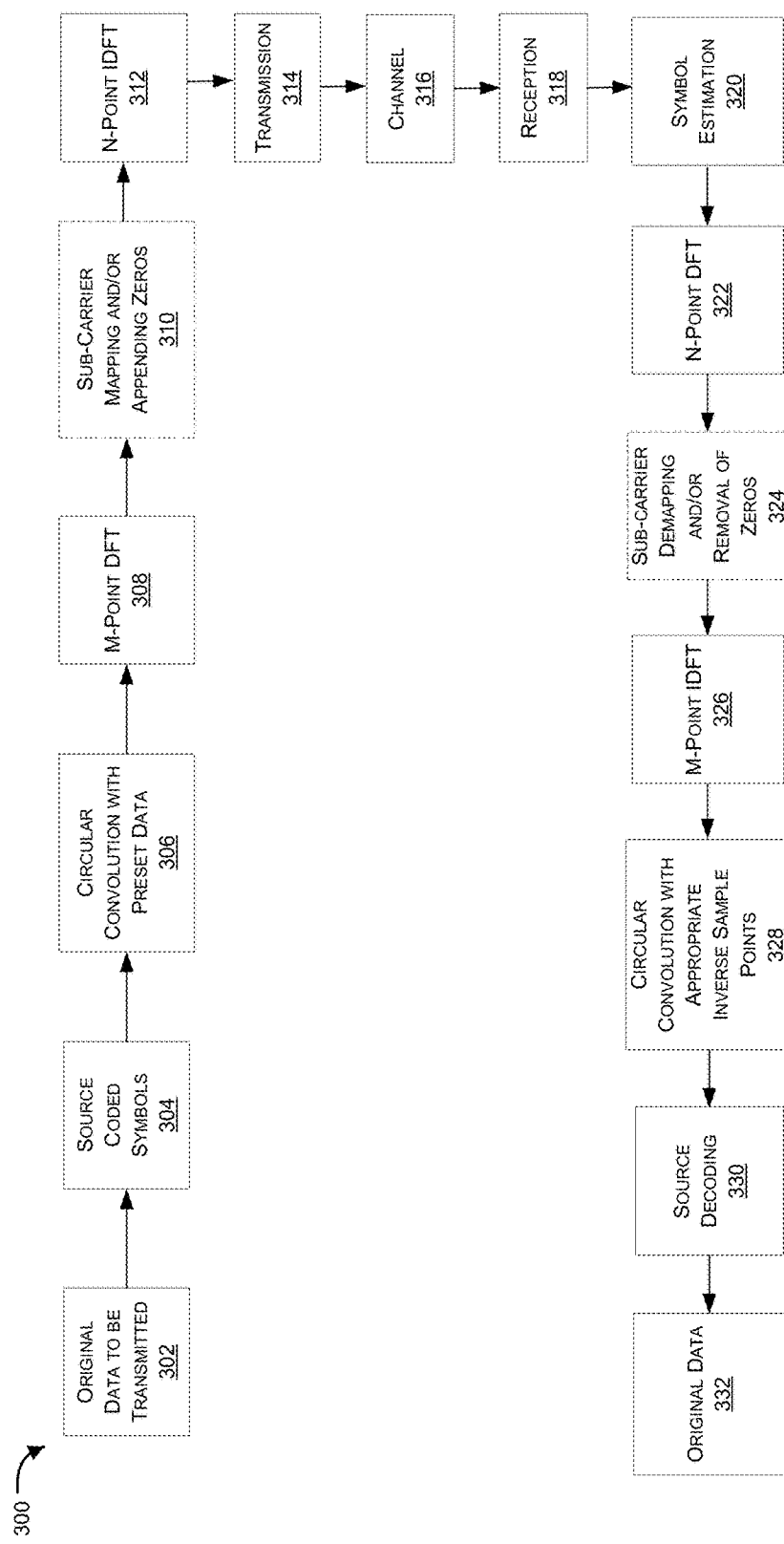
FIG. 3 illustrates an exemplary block diagram of transmitter and receiver deployed in communication network and configured to operate in accordance with an embodiment of the present disclosure.

FIG. 3 illustrates an exemplary block diagram 300 of transmitter and receiver deployed in communication network and configured to operate in accordance with an embodiment of the present disclosure. At block 302, original data to be transmitted is received at the transmitter end, and at block 304, the transmitter can source code the original data into a plurality of symbols, which at block 306, can be circularly convolved with a defined number of preset values. At step 308, an M-point DFT can be computed on the processed symbols to generate a first set of discrete Fourier transformation (DFT) samples, based on which, at the transmitter end, at block 310, sub-carrier mapping and/or one or more zeros can be appended. At block 312, at the transmitter end, the first set of DFT samples can be processed based on an N-point IDFT operation to give a first set of inverse discrete Fourier transformation (IDFT) samples, which can finally be transmitted by the transmitter at 314 through a channel 316.

At block 318, on the receiver end, the first set of IDFT samples can be received, and at block 320, symbol estimation, if desired can be performed on the first set of IDFT samples to remove noise/error, if any. At block 322, the first set of IDFT samples can be processed based on an N-point DFT operation to give a second set of DFT samples, post which, at block 324, sub-carrier de-mapping and/or one or more zeros can be removed if the corresponding operation was carried out in block 310. At step 326, the second set of DFT samples can be processed using an M-point IDFT operation to give a second set of IDFT samples, which at block 328, can be circularly de-convolved with appropriate inverse sample points. At block 330, source decoding that is inverse to the source coding performed at block 304 can be performed, based on which, at block 332, original data can be processed/obtained by the receiver.

Figure 4:
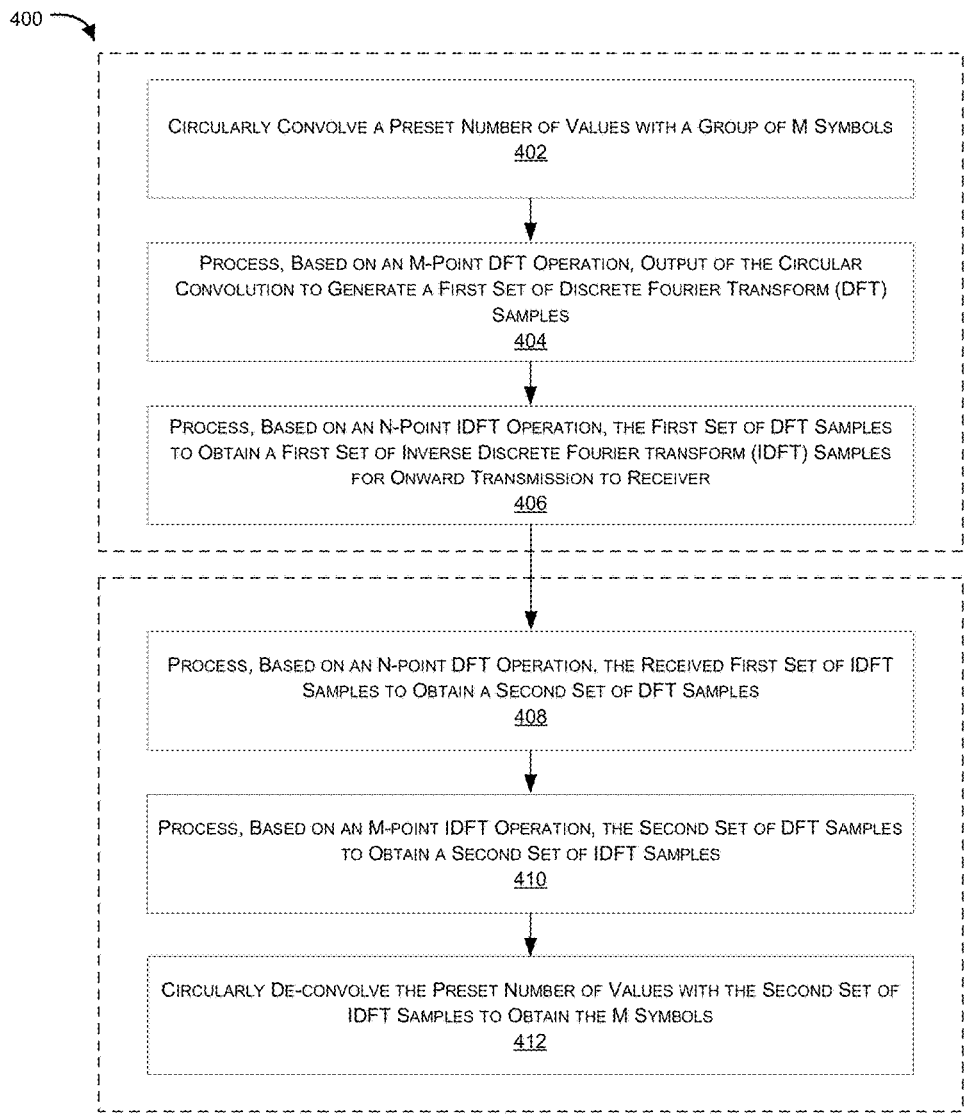
FIG. 4 illustrates an exemplary flow diagram of the proposed communication system/architecture in accordance with an embodiment of the present disclosure.

FIG. 4 illustrates an exemplary flow diagram 400 of a method of communication for achieving low PAPR in accordance with an embodiment of the present disclosure. In an aspect, the method can, at step 402, circularly convolve a preset number of values with a group of M symbols that are selected from a total number of symbols. At step 404, the method can process, based on an M-point DFT operation, output of the circular convolution to generate a first set of discrete Fourier transform (DFT) samples, and at step 406, the method can, process, based on an N-point IDFT operation, the first set of DFT samples to obtain a first set of inverse discrete Fourier transform (IDFT) samples for onward transmission to the receiver. At step 408, at the receiver side, the method can process, based on an N-point DFT operation, the received first set of IDFT samples to obtain a second set of DFT samples, and at step 410, can process, based on an M-point IDFT operation, the second set of DFT samples to obtain a second set of IDFT samples. At step 412, the method can circularly de-convolve the preset number of values with the second set of IDFT samples to obtain the M symbols.

Figure 5A:
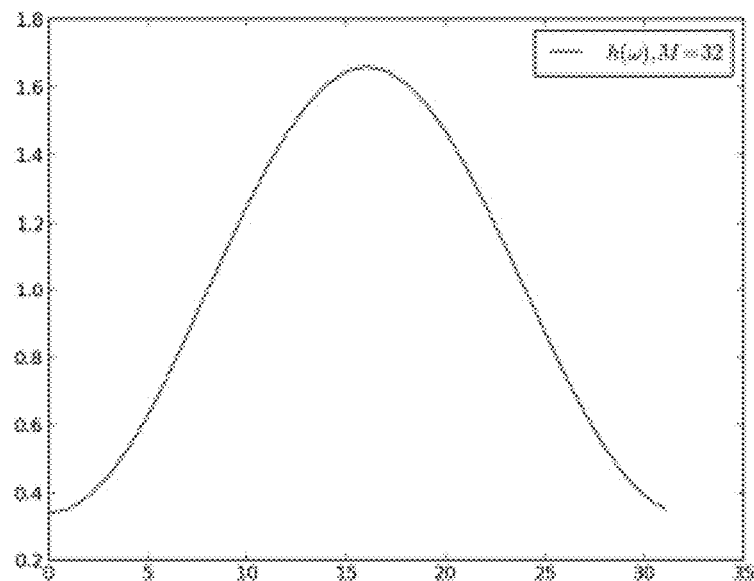
FIG. 5A illustrates an exemplary frequency domain function in accordance with an embodiment of the present disclosure.
Figure 5B:
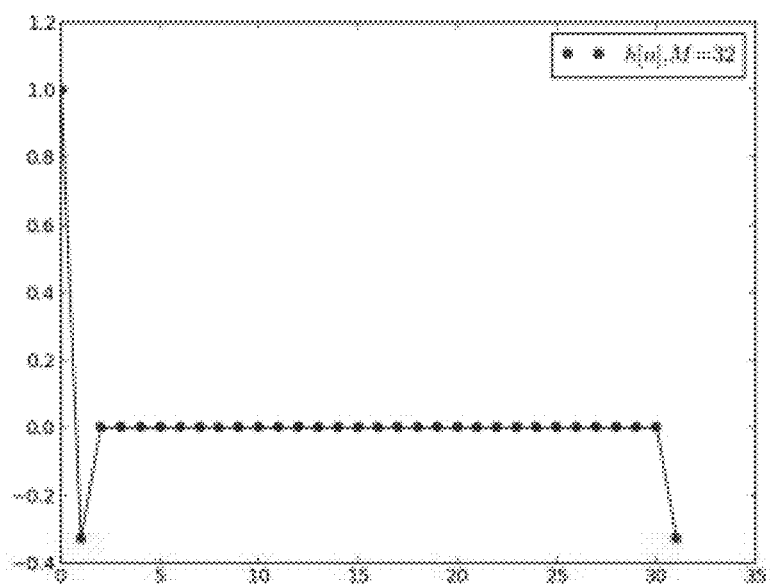
FIG. 5B illustrates an exemplary discrete time function in accordance with an embodiment of the present disclosure.

FIG. 5A illustrates an exemplary frequency domain function 500 which is the frequency domain representation of the exemplary time domain function 510. FIG. 5B illustrates an exemplary discrete time function 510 that can be used for circular convolution in accordance with an embodiment of the present disclosure. One block of M-point symbols of input, which in accordance with the embodiment of the present disclosure, can be processed by circular convolution module, M-point DFT module, N-Point IDFT module before being transmitted by the transmission module to the receiver using appropriate channels or sub-channels. In an implementation, value of M can be 32, 64 or any other number.

FIG. 5B illustrates an exemplary discrete time function 510 that can be used for circular convolution in accordance with an embodiment of the present disclosure. The example discrete time function h[n], as shown in FIG. 5B, can be used for performing circular convolution of the M-point symbols of input with h[n] to perform time domain spreading. In an implementation, the discrete time function h[n] can be an M-point discrete time function. An example function h[n] can be presented as h[n]=[1, −0.3, 0, 0, 0, . . . 0, −0.3], where the number of consecutive zeros are M−3, i.e. 32−3=29 in the given example. In an implementation, the total number of samples in one block of h[n] can be 32, 64 or any other number. For the convenience of calculation, sample size, also referred as block size, of the M-point input symbols can be same as the sample size of the discrete time domain function h[n]. In an implementation, circular convolution of M-point input block can be performed with function h[n], which leads to spreading in time domain.

Figure 5C:
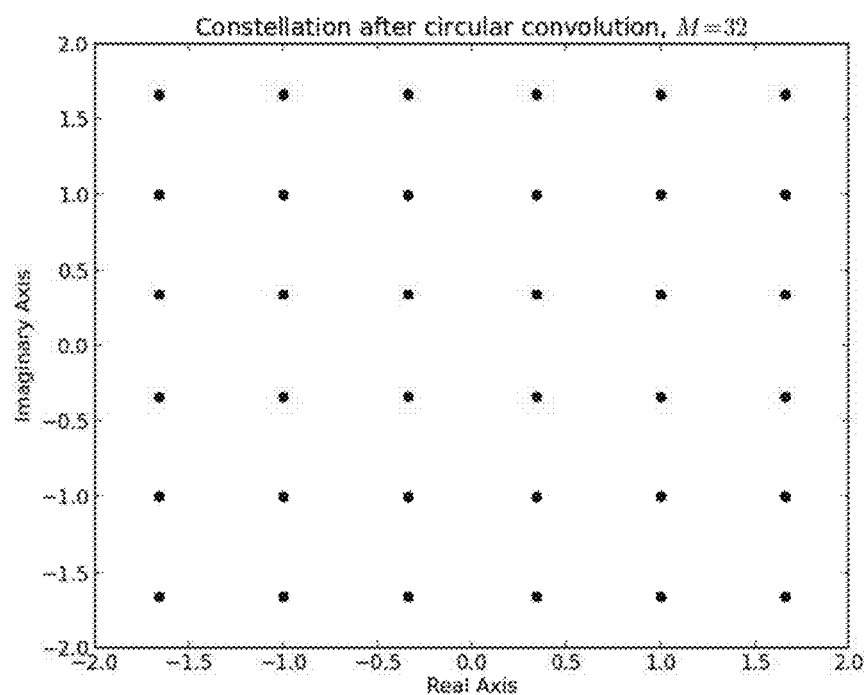
FIG. 5C illustrates an exemplary constellation graph of convolved symbols in accordance with an embodiment of the present disclosure.

FIG. 5C illustrates an exemplary constellation graph 530 of convolved symbols in accordance with an embodiment of the present disclosure. The constellation graph of FIG. 5C presents time domain values of symbols, which are calculated by performing circular convolution of M-symbols of input data with preset time domain function h[n]. After getting the first set of convolved values, M-point DFT module can perform discrete Fourier transform of the convolved symbols.

Figure 5D:
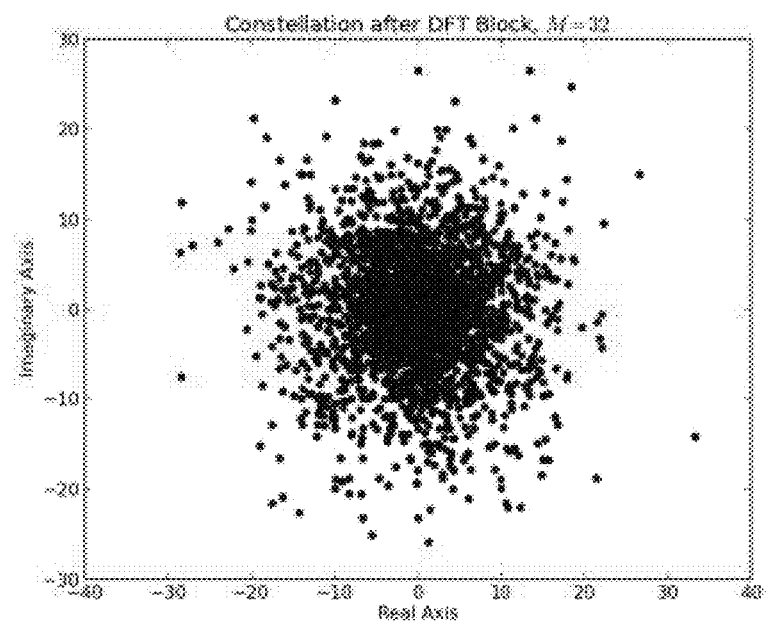
FIG. 5D illustrates an exemplary constellation graph of DFT transformed symbols directly on the input symbols.
Figure 5E:
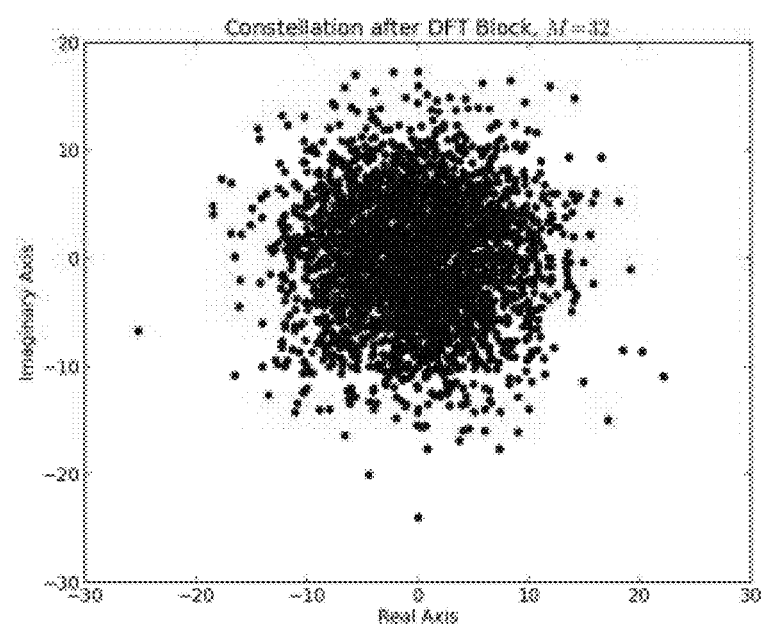
FIG. 5E illustrates an exemplary constellation graph of first DFT transformed symbols on the convolved symbols in accordance with an embodiment of the present disclosure.

FIG. 5D illustrates an exemplary constellation graph 540 of DFT transformed symbols directly on the input symbols, and FIG. 5E illustrates an exemplary constellation graph 550 of first DFT transformed symbols on the convolved symbols. As can be observed, distribution of symbols values in the graph is more in FIG. 5D, which is a representation of DFT transformed symbols value for the input data without performing circular convolution, as compared to distribution of the DFT transformed symbols values of convolved symbols. Distribution of the values has been minimized by performing circular convolution of the input with a preselected discrete time function. One can appreciate that lesser the distribution of symbol values to be transmitted, lower will be the PAPR value of the transmitted symbols.

As discussed above, M-point DFT module can apply discrete Fourier transform function, such as fast Fourier transformation (FFT) function over the convolved symbols. FIG. 5E is an exemplary representation of constellation values after performing FFT on the convolved symbols. The first DFT transformed symbols can be processed by N-point IDFT module, which can apply inverse DFT function on the first DFT transformed symbols to get a first set of IDFT transformed symbols.

Figure 5F:
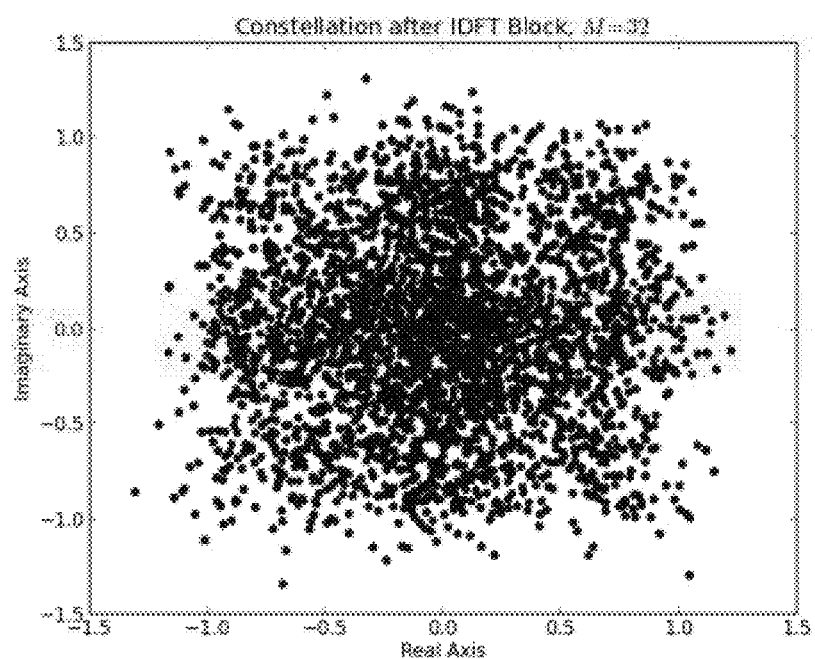
FIG. 5F illustrates an exemplary constellation graph of IDFT transformed symbols where the IDFT was applied on the symbols that were not circularly convolved.

FIG. 5F illustrates an exemplary constellation graph 560 of IDFT transformed symbols where the IDFT was applied on the symbols that were not circularly convolved. As can be observed from FIG. 5F, after applying IDFT on the DFT transformed symbols, which was applied directly on the input symbols, without performing circular convolution, the IDFT transformed symbols value are heavily distributed.

Figure 5G:
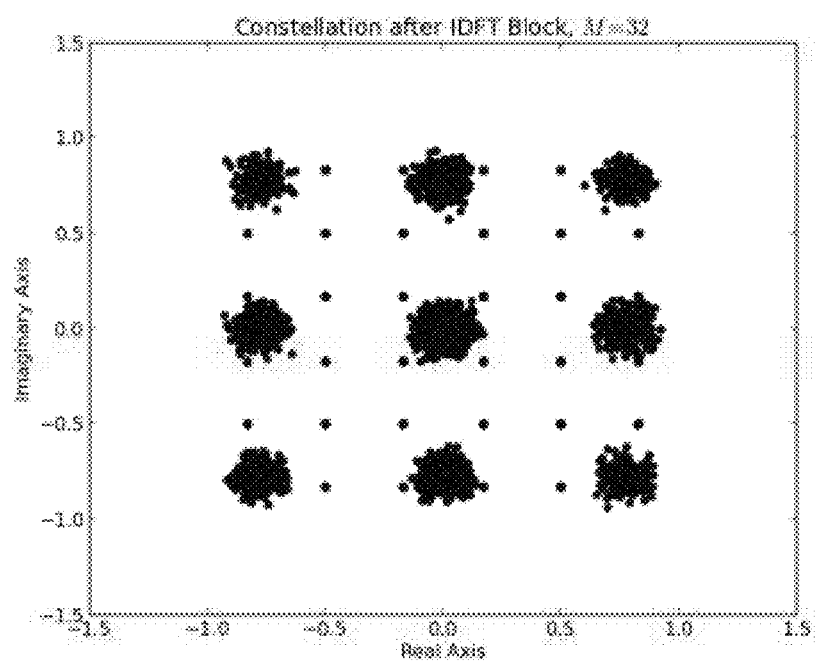
FIG. 5G illustrates an exemplary constellation graph of the first set of IDFT transformed symbols in accordance with an embodiment of the present disclosure.

FIG. 5G illustrates an exemplary constellation graph 570 of the first set of IDFT transformed symbols in accordance with an embodiment of the present disclosure. One can observe that the first set of IDFT transformed symbols value, wherein the circular convolution was applied on the input data, distribution of IDFT transformed symbols are very less. The first set of IDFT transformed symbol values is very concentrated, and hence in order to transmit such data/signal, transmitter will not apply peak powers, and average power consumed by the transmitted can be minimized. By performing circular convolution, M-point DFT and then N-point IDFT, system and method of the present disclosure can achieve low PAPR value as the power required by transmitter to send the first set of IDFT transformed symbols will have less peaks as the symbols values are concentrated.

Figure 6:
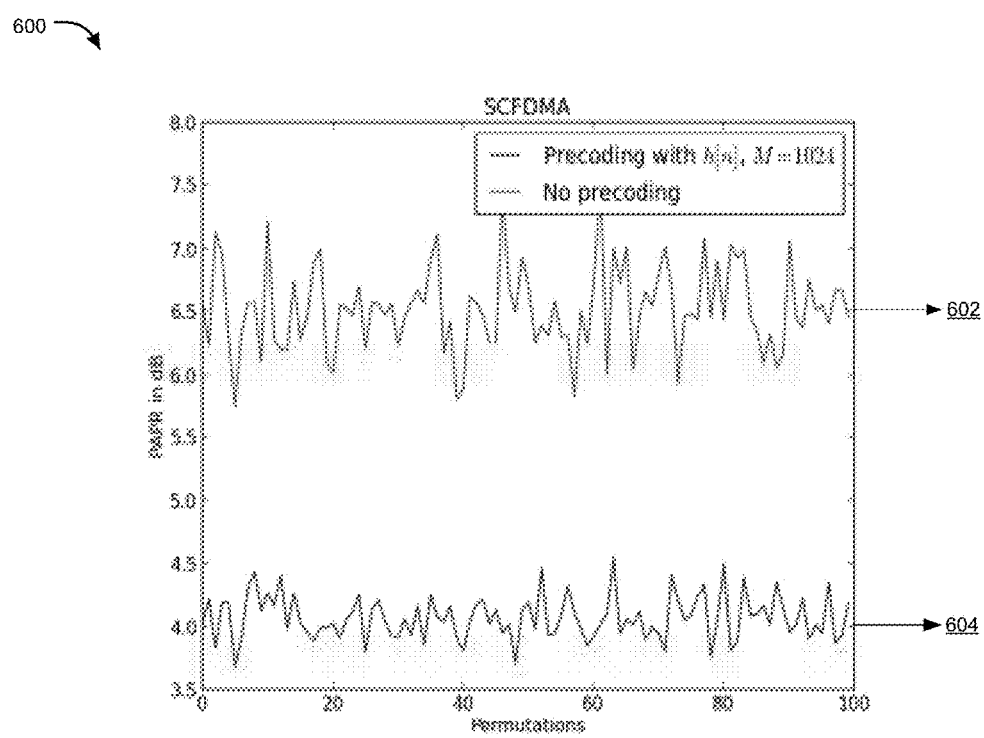
FIG. 6 illustrates an exemplary comparison of PAPR values of transmitter that has not applied circular convolution vs. PAPR values of the proposed inventive transmitter that has applied circular convolution over the input signal in accordance with an embodiment of the present disclosure.

FIG. 6 illustrates an exemplary comparison of PAPR values of transmitter that has not applied circular convolution over the input signal before applying the DFT/IDFT functions when compared with PAPR values of the proposed inventive transmitter that has applied circular convolution over the input signal in accordance with an embodiment of the present disclosure. As can be observed, PAPR values of the transmitter that has not applied circular convolution over the input signal before applying the DFT and IDFT function, as shown by graph 602, have high variation. For graph 602, the PAPR values range between 5.8 to 7.2 dB, which can be considered very high in certain application.

Graph 604, on the other hand, represents PAPR values of the first IDFT transformed symbols where the proposed transmitter has applied circular convolution over the input signal in accordance with an embodiment of the present disclosure, wherein, as can be seen, the PAPR values are very low as compared to PAPR values of graph 602. PAPR values for graphs 604 range from 3.6 to 4.4, which is considered to be low/optimal, when compared with PAPR values shown in graph 602.

Although embodiments of the present disclosure have been explained in sequence of their exemplary implementation, wherein circular convolution is first performed on the input symbols to obtain convolved symbols, followed by implementation of M-point DFT operation on the convolved symbols to get the first set of DFT transformed symbols, and further followed by implementation of N-point IDFT operation on the first set of DFT transformed symbols to get the first set of IDFT transformed symbols, one can appreciate that such a sequence on which different operations (such as circular convolution, DFT, IDFT) are performed, can be changed or modified or new steps can be incorporated therein, all of which are completely within the scope of the present disclosure.

Figure 7:
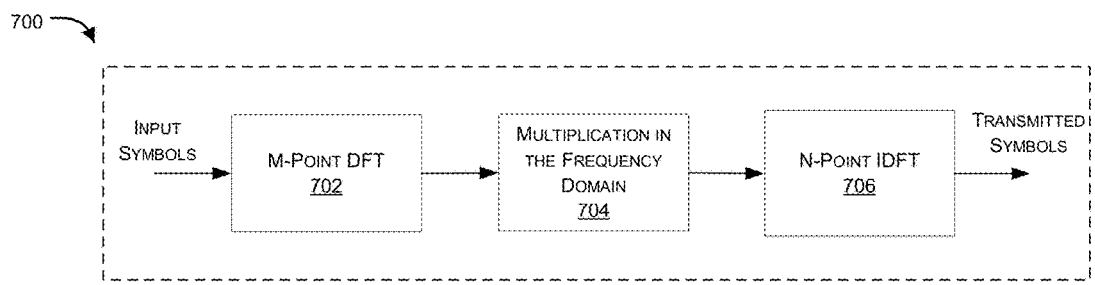
FIG. 7 illustrates an exemplary alternative arrangement of functional modules of the transmitter side sub-system in accordance with an embodiment of the present disclosure.

FIG. 7 illustrates an exemplary alternative arrangement of functional modules of the transmitter side sub-system in accordance with an embodiment of the present disclosure. As illustrated in FIG. 7, upon receiving the input symbols, the transmitter can first apply M-point DFT 702 over the input symbols, and then perform multiplication in frequency domain 704 on the transformed DFT symbols with h(w), and then apply N-point IDFT 706 on the multiplied symbols. In an exemplary implementation, irrespective of operation applied (time domain circular convolution or equivalently frequency domain multiplication), performance of the transmitter that applies time domain circular convolution (or equivalently frequency domain multiplication), M-point DFT, and N-point IDFT can be same.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure provides a communication system and method for achieving low peak to average power ratio over a transmitter of a wireless device.

The present disclosure provides a communication system and method for achieving low peak to average ratio and minimizing power consumption of the transmitter/access points.

The present disclosure provides a transmitter having a low PAPR value, which provides wide coverage.

The present disclosure provides a method and system for maximum or optimal use of transmitter and communication channels.

The present disclosure provides a low PAPR value by temporal and spacial spreading.

The present disclosure provides a communication system and method for information communication that employ a transmitter that sends processed symbols spread in time domain to the receiver for achieving low PAPR.

We claim:

1. A transmitter of a communication system comprising:
    a circular convolution module configured to circularly convolve a preset number of values with a group of M symbols from a total number of symbols;
    a M-point DFT module configured to process output of the circular convolution to generate a first set of discrete Fourier transform (DFT) samples; and
    an N-point IDFT module configured to process the first set of DFT samples to obtain a first set of inverse discrete Fourier transform (IDFT) samples for onward transmission to a receiver.

2. The transmitter of claim 1, wherein the receiver comprises:
    an N-point DFT module configured to process the received first set of IDFT samples to obtain a second set of DFT samples;
    an M-point IDFT module configured to process the second set of DFT samples to obtain a second set of IDFT samples; and
    circular de-convolution module configured to circularly de-convolve the preset number of values with the second set of IDFT samples to obtain the M symbols.

3. The transmitter of claim 1, wherein the transmitter and the receiver are connected through a communication channel.

4. The transmitter of claim 1, wherein the transmitter further comprises a source encoding module configured to encode information to be transmitted into the total number of symbols, and wherein the receiver further comprises a source decoding module configured to decode the total number of symbols to retrieve the information transmitted by the transmitter.

5. The transmitter of claim 1, wherein the preset number of values are obtained from any or a combination of mathematical distribution, Gaussian distribution, Soliton distribution, Rayleigh distribution, Rician distribution, Inverse Gaussian distribution, Raised Cosine distribution, and Root raised Cosine distribution.

6. The transmitter of claim 1, wherein one or more zeros are appended to the first set of DFT samples before conversion to the first set of IDFT samples to enable compression in frequency domain.

7. The transmitter of claim 1, wherein sub-carrier mapping is performed on the first set of DFT samples before conversion to the first set of IDFT samples to enable compression in frequency domain.

8. The transmitter of claim 1, wherein the receiver filters the received first set of IDFT samples before processing the received first set of IDFT samples.

9. The transmitter of claim 1, wherein each symbol of the group of M symbols is circularly convolved with at least a part of the preset number of values.

10. The transmitter of claim 1, wherein the M-point DFT module is implemented as an M-point Fast Fourier Transform (FFT), and wherein the N-point IDFT module is implemented as an N-point Inverse Fast Fourier Transform (IFFT).

11. The transmitter of claim 10, wherein N>=M.

12. The transmitter of claim 1, wherein at the receiver, the N-point DFT module is implemented as an N-point Fast Fourier Transform (FFT), and wherein the M-point IDFT module is implemented as an M-point Inverse Fast Fourier Transform (IFFT).

13. A method for communication between a transmitter and a receiver, comprising the steps of:
circularly convolving a preset number of values with a group of M symbols from a total number of symbols;
processing, based on an M-point DFT operation, output of the circular convolution to generate a first set of discrete Fourier transform (DFT) samples; and
processing, based on an N-point IDFT operation, the first set of DFT samples to obtain a first set of inverse discrete Fourier transform (IDFT) samples for onward transmission to the receiver;
processing, based on an N-point DFT operation, the received first set of IDFT samples to obtain a second set of DFT samples;
processing, based on an M-point IDFT operation, the second set of DFT samples to obtain a second set of IDFT samples; and
circularly de-convolving the preset number of values with the second set of IDFT samples to obtain the M symbols.

14. The method of claim 13, wherein, at the transmitter, the M-point DFT operation is implemented as an M-point Fast Fourier Transform (FFT), and wherein the N-point IDFT operation is implemented as an N-point Inverse Fast Fourier Transform (IFFT), and wherein N>=M.

15. The method of claim 13, wherein at the receiver, the N-point DFT operation is implemented as an N-point Fast Fourier Transform (FFT), and wherein the M-point IDFT operation is implemented as an M-point Inverse Fast Fourier Transform (IFFT).

* * * * *